United States Patent
Sommer et al.

(10) Patent No.: US 7,047,436 B2
(45) Date of Patent: May 16, 2006

(54) DIGITAL MICROELECTRONIC CIRCUIT WITH A CLOCKED DATA-PROCESSING UNIT AND A CONVERTING UNIT

(75) Inventors: Sabine Sommer, Stelle (DE); Detlef Müller, Barsbuettel (DE); Markus Feuser, Hamburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1038 days.

(21) Appl. No.: 09/888,461

(22) Filed: Jun. 25, 2001

(65) Prior Publication Data
US 2002/0042890 A1 Apr. 11, 2002

(30) Foreign Application Priority Data
Jun. 27, 2000 (DE) .......................... 100 31 222

(51) Int. Cl.
*G06F 1/04* (2006.01)

(52) U.S. Cl. .......................... 713/600; 360/32; 360/39; 370/521; 382/304

(58) Field of Classification Search ................ 382/304; 370/521; 360/39, 32; 713/600
See application file for complete search history.

(56) References Cited

U.S. PATENT DOCUMENTS

| | | | | | |
|---|---|---|---|---|---|
| 4,598,411 | A | * | 7/1986 | Berkovich et al. | 375/246 |
| 4,953,039 | A | * | 8/1990 | Ploch | 360/32 |
| 5,054,020 | A | * | 10/1991 | Meagher | 370/305 |
| 5,140,248 | A | * | 8/1992 | Rowan et al. | 318/811 |
| 6,359,946 | B1 | * | 3/2002 | Ryan | 375/371 |
| 6,366,687 | B1 | * | 4/2002 | Aloni et al. | 382/144 |
| 6,556,716 | B1 | * | 4/2003 | Hong | 382/232 |

* cited by examiner

*Primary Examiner*—Rehana Perveen
(74) *Attorney, Agent, or Firm*—Kevin Simons

(57) ABSTRACT

A digital microelectronic circuit comprises a clocked data-processing unit (1) and a converting unit (2) which reads in data present at the output of the data-processing unit, performs a predetermined converting operation on the data and passes on the converted data. The converting unit is realized in an asynchronous logic circuit, such that the period of time for performing the converting operation is shorter than the shortest time interval to the next change of the data present at the output of the data-processing unit. In this way, fast, serial synchronous processes can be parallelized from the point of view of the slow synchronous system in synchronous systems which are slow relative thereto by using asynchronous logics, without a further high-frequency clock system being required.

11 Claims, 1 Drawing Sheet

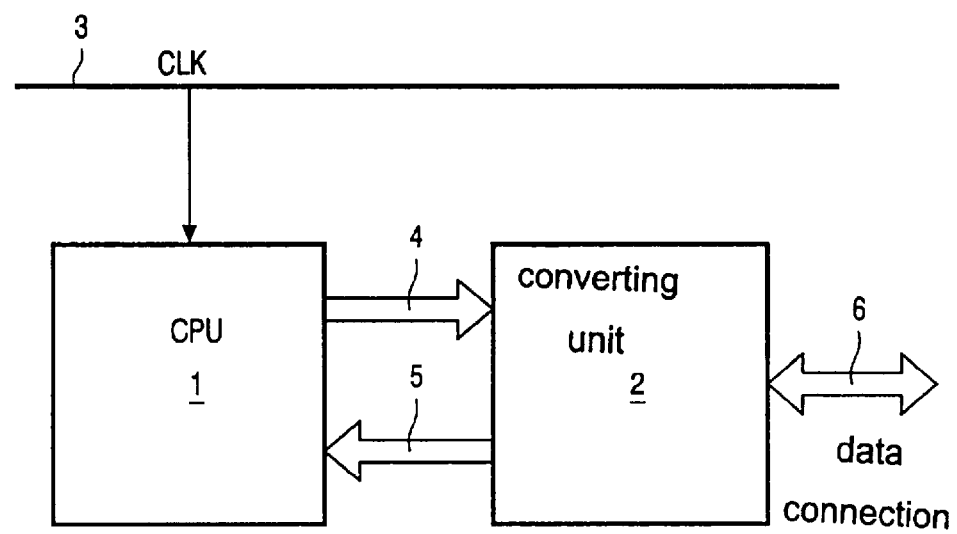

DIGITAL MICROELECTRONIC CIRCUIT WITH A CLOCKED DATA-PROCESSING UNIT AND A CONVERTING UNIT

The invention relates to a digital microelectronic circuit comprising a clocked data-processing unit and a converting unit which reads in the parallel data present at the output of the data-processing unit, performs a predetermined converting operation on the data and passes on the converted data.

In digital microelectronic circuits, data are usually manipulated synchronously, i.e. in a system clock. Successive processing units for serially processing data are usually clocked by the same clock in order that the serial processing steps can be performed in an orderly and synchronous way.

The drawback of such a successive arrangement of synchronous processing units is that the slowest processing unit predetermines the maximum allowable clock rate. Moreover, a processing unit may require a plurality of clock cycles for performing its data manipulation. In this case, the other processing units must wait for an equal number of clock cycles until they can start processing new data. The speed of the serial data processing with synchronous processing units is thus fixed by the slowest elements in two respects, namely both in the applicable clock rate and in the data-processing rate (number of clocks required for a complete data manipulation).

An example of a serial synchronous data processing is the encryption or checking of data supplied by a primary data-processing unit such as a microprocessor (CPU). These data are typically secured against transmission errors or checked for transmission errors by means of a method of serial procedures, for example, a CRC method (Cyclic Redundancy Check).

To increase the processing rate in serial data processing systems, it is known to use n different processing units with n different clock rates. For example, a converting unit may advantageously be operated with the multiple clock rate similarly as the other processing units when it requires less time for performing a single clock than the other units and when it requires more clocks than the other processing units for completing the data manipulation. In this way, a certain acceleration of the overall processing in a system can be achieved in a system with fast serial synchronous processes and relatively slow synchronous processes. The availability of two or more different clock systems leads, however, to problems in generating the clocks. Particularly, it may lead to disturbances due to superimposed clocks. Moreover, speed limits in the overall processing may result from a limited maximal clock so that the speed of the procedure does not predetermine the maximum possible processing speed.

Based on this background, it is an object of the present invention to improve a digital microelectronic circuit of the type described in the opening paragraph in such a way that an increase of the overall processing rate of data is obtained in a simple manner.

This object is achieved with a circuit as defined in the characterizing part of claim 1.

The digital microelectronic circuit comprises at least one system-clocked data-processing unit such as, for example, a microprocessor, as well as a converting unit which reads in the data present at the output of the data processing unit, performs a predetermined converting operation on these data and passes on the data thus converted. The circuit is characterized in that the converting unit is realized in an asynchronous logic circuit, such that the period of time for performing the converting operation in this logic circuit is shorter than the shortest time interval to the next change of the data present at the output of the data-processing unit.

In the circuit according to the invention, a serial processing of data is performed with synchronous, clocked units and asynchronous, unclocked units. Although the processing units are not synchronized on the basis of a common clock, an ordered, serial processing of the data can nevertheless be achieved in that the processing speed of the asynchronous logic is realized in a given manner with a view to the other units. The condition imposed on the processing speed of the asynchronous logic is that the period of time for performing a converting operation with data present at the input is shorter than the shortest possible time interval to the next change of the data present at the output of the data-processing unit. This condition is particularly complied with when the maximum duration of the converting operation regarding all data in question is shorter than the minimum time interval between the change of data at the output of the data-processing unit. Said conditions ensure that the converting operation by the asynchronous logic is terminated when new data for conversion are present at the output of the data-processing unit.

In an embodiment of the circuit according to the invention which is particularly relevant in practice, the converting operation is an encryption and/or checking operation in the converting unit. Preferably, this may be a CRC method. The execution of such a method requires a proportionally large number of clock cycles in a synchronous logic, so that the performance of this method reduces the overall processing speed of the data in a prior-art synchronous system. On the other hand, for example, a CRC method can be realized with a small logic gate depth so that it can be carried out at a high speed in an asynchronously operating converting unit.

The invention will hereinafter be described by way of example with reference to the sole FIGURE. The FIGURE shows diagrammatically a digital microelectronic circuit with two processing units, namely a digital microprocessor (CPU) 1 and a converting unit 2. Data which are parallel present at the output of the data-processing unit 1 are to be checked by the converting unit 2 by means of a serial encryption method. For example, a CRC-32 method CPU op-code may be performed in the converting unit 2.

The data-processing unit 1 is connected to a clock signal connection 3 for transmitting the system clock CLK. In conventional systems, the converting unit 2 would also be connected to the clock signal connection 3 so as to be able to operate synchronously with the data-processing unit 1. However, for a synchronous serial processing, the encryption of a plurality of clock periods would be required before the next parallel data word could be processed. Under circumstances, this would lead to considerable waiting times in the parallel data-processing operation.

According to the invention, the converting unit 2 is therefore realized by means of an asynchronous logic so that it operates independently of the system clock on the connection 3. The converting operation to be performed nevertheless takes place at a high speed because processes with a small logic gate depth can be run considerably faster than are predetermined by the system frequency. The serial encryption by means of an asynchronous logic can be performed so quickly that it is terminated before new data are made available by the data-processing unit 1. The overall procedure of serial data processing is therefore not disturbed by the fact that the converting unit 2 operates asynchronously.

The system shown in the FIGURE provides, for example, the possibility of asynchronously performing a CRC-32 encryption in two system clock periods of a 16 MHz clock processor. When the data to be recorded are available every two clock periods, a quasi-parallel encryption from the point of view of the data-processing unit 2 is obtained.

Due to the embodiment of the circuit according to the invention, fast, serial synchronous processes can thus be parallelized from the point of view of the slow synchronous system in synchronous systems which are slow relative thereto by using asynchronous logics, without a further high-frequency clock system being required.

The converting unit 2 passes the conversion results on to a subsequent unit at its input/output 6. Alternatively, it may also pass on the asynchronously computed results via the connection 5 to the CPU 1 for further processing. Similarly, it is possible for the converting unit 2 to receive its input data via the connection 6.

In addition to the CRC or CRC-32 methods, other examples of the function of the converting unit 2 are data compression, error correction, encryption methods, hash functions and the like.

| | Reference numerals: |
|---|---|
| 1 | data-processing unit CPU |
| 2 | converting unit |
| 3 | clock signal connection |
| 4, 5, 6 | data connection |

What is claimed is:

1. A digital microelectronic circuit comprising a clocked data-processing unit and a converting unit which reads in data present at the output of the data-processing unit, performs a predetermined converting operation on the data and passes on the converted data, characterized in that the converting unit is realized in an asynchronous logic circuit, such that the period of time for performing the converting operation is shorter than the shortest time interval to the next change of the data present at the output of the data-processing unit.

2. The digital microelectronic circuit as claimed in claim 1, characterized in that the converting operation is an encryption, a compression, an error correction, a hash function and/or checking operation.

3. The digital microelectronic circuit of claim 1, wherein the converting operation is a CRC operation.

4. The digital microelectronic circuit of claim 1, wherein the converting unit passes on the converted data to the data-processing unit.

5. The digital microelectronic circuit of claim 1, wherein the converting unit is operable to receive data to be converted from a logic block other than the data-processing unit.

6. A digital system, comprising:

a first synchronous data processing circuit that operates at a first clock rate that has a first clock period; and an asynchronous converting unit, coupled to the first synchronous data processing circuit, the asynchronous converting unit having a conversion time that is less than the first clock period;

wherein the first synchronous data processing circuit is operable to provide digital data to the asynchronous converting unit such that the provided data does not change faster than the first clock period; and wherein the asynchronous converting unit is operable to provide converted digital data to the first synchronous data processing circuit.

7. The digital system of claim 6, wherein the asynchronous converting unit further comprises an input connection, that is not connected to the first synchronous data processing circuit, the input connection operable to receive digital data for conversion.

8. The digital system of claim 6, wherein the asynchronous converting unit further comprises an output connection, that is not connected to the first synchronous data processing circuit, the output connection operable to provide digital converted data.

9. The digital system of claim 6, wherein the asynchronous converting unit is operable to perform at least one of the tasks selected from the group consisting of encryption, compression, error correction, and hash functions.

10. A method of processing data, comprising:

generating digital data in a synchronous data processing unit;

providing first digital data to an input of an asynchronous digital converting unit and holding the first digital data at the input;

asynchronously computing a digital result in the asynchronous digital converting unit; and providing second digital data, subsequent to asynchronously computing the result, to the input of the asynchronous digital converting unit.

11. The method of claim 10, further comprising providing the asynchronously computed digital result to the synchronous data processing unit.

* * * * *